(12) United States Patent
Vashchenko et al.

(10) Patent No.: US 7,050,314 B1
(45) Date of Patent: May 23, 2006

(54) LVTSCR CHARGE PUMP CONVERTER CIRCUIT

(75) Inventors: Vladislav Vashchenko, Palo Alto, CA (US); Peter J. Hopper, San Jose, CA (US); Yuri Mirgorodski, Sunnyvale, CA (US); Philipp Lindorfer, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 42 days.

(21) Appl. No.: 10/625,961

(22) Filed: Jul. 23, 2003

(51) Int. Cl.
   *H02M 3/18* (2006.01)

(52) U.S. Cl. .................................... 363/60; 323/312

(58) Field of Classification Search ............... 323/312; 363/59, 60; 307/109, 110
See application file for complete search history.

(56) References Cited

U.S. PATENT DOCUMENTS

| | | | | |
|---|---|---|---|---|
| 5,543,668 | A | * | 8/1996 | Fong ........................... 307/110 |
| 5,734,205 | A | * | 3/1998 | Okamura et al. ........... 307/110 |
| 6,002,568 | A | * | 12/1999 | Ker et al. .................... 361/111 |
| 6,433,368 | B1 | * | 8/2002 | Vashchenko et al. ....... 257/173 |
| 6,465,990 | B1 | * | 10/2002 | Acatrinei et al. ........... 323/222 |
| 2004/0080964 | A1 | * | 4/2004 | Buchmann ................... 363/60 |

* cited by examiner

*Primary Examiner*—Adolf Berhane
(74) *Attorney, Agent, or Firm*—Jurgen Vollrath

(57) ABSTRACT

A charge pump circuit in which at least one of the switching elements takes the form of a LVTSCR. The switching on and off of the LVTSCRs may be achieved by making use of a pulsed input and relying on the triggering and holding voltages of the LVTSCRs to switch on and off.

5 Claims, 5 Drawing Sheets

US 7,050,314 B1

LVTSCR CHARGE PUMP CONVERTER CIRCUIT

FIELD OF THE INVENTION

The invention relates to a charge pump circuit. In particular in relates to a DC—DC converter circuit making use of a charge pump.

BACKGROUND OF THE INVENTION

Charge pumps are commonly used for converting from one DC voltage level to another by making use of a plurality of capacitors that are charged up and then connected in parallel. The principle is best described by referring to a simple schematic representation of a charge pump circuit as shown in FIGS. 1 and 2. FIG. 1 shows a plurality of capacitors (in this case three capacitors) 100, 102, 104 connected in parallel across a DC voltage source 108. Switches 110, 112, 114, 116, 118, 120, 122, 124, 126, 128 are provided to selectively open and close to allow the capacitors to be charged in parallel by the voltage source 108, and then be connected in series with the voltage source to provide the effective circuit shown in FIG. 2 (switches 110–126 deleted for purposes of simplicity). This, in effect provides an output voltage across output capacitor 132 that is the sum of the voltages across each individual capacitor and the voltage of the voltage source (four times higher in this case for the three capacitors 100, 102, 104). In the simplified circuit of FIG. 1, the combined voltage on the capacitors 100, 102, 104 as well as the voltage of the voltage source 110 is applied across the output capacitor 132 by making use of the switch 128 working in conjunction with the other switches to charge the output capacitor 132 to four times the voltage of the voltage source 108. This concept is used to provide a DC—DC converter such as the prior art charge pump converter 300 shown in FIG. 3.

The converter of FIG. 3 takes the form of a pump circuit which includes switches and capacitors, including an output capacitor 304. The charge pump circuit is supplied by a DC voltage source 300, and includes an accumulation capacitor 302. The switches, in this case, comprise three MOS transistors, 310, 312, 314, the switching of which is controlled by signals from a clock circuit 320. During the charging portion, PMOS 310 and NMOS 312 are opened (turned on) to permit current to flow through them to charge up capacitor 302, while PMOS 314 is turned off. Once the capacitor 302 is charged, the clock circuit 320 biases the gates of the transistors to turn off transistors 310 and 312, and turn on transistor 314. This provides almost twice the input voltage across the output capacitor 304 due to the serial connection of the voltage source 300 and charged capacitor 302. As shown in FIG. 3, the output capacitor 304 is separated from the pump circuit by a diode 322. In order to support high charging currents the circuit of FIG. 3 makes use of rather large PMOS 310 and NMOS 312 transistors. This results in high parasitic capacitance, which, in turn, results in low charging rate.

SUMMARY OF THE INVENTION

The invention provides a charge pump that makes use of LVTSCRs as switching elements. In one embodiment the snapback characteristics of an LVTSCR are used to provide for self triggering as is discussed in further detail below.

According to the invention, there is provided a charge pump supplied by a DC supply, the charge pump comprising one or more capacitors that are charged during a charging cycle, and switching elements for connecting the one or more capacitors in parallel during the charging cycle and in series during a discharge cycle, wherein at least one of the switching elements is a LVTSCR operating in snapback mode. The switching elements may be controlled by a clock circuit. The LVTSCR switching elements may instead make use of a pulsed input and use the changing voltage of the input signal and the snapback characteristics of a LVTSCR to provide for self triggering, thereby turning on and off as certain voltage levels are reached across the LVTSCRs.

DETAILED DESCRIPTION OF THE INVENTION

Figure 4:
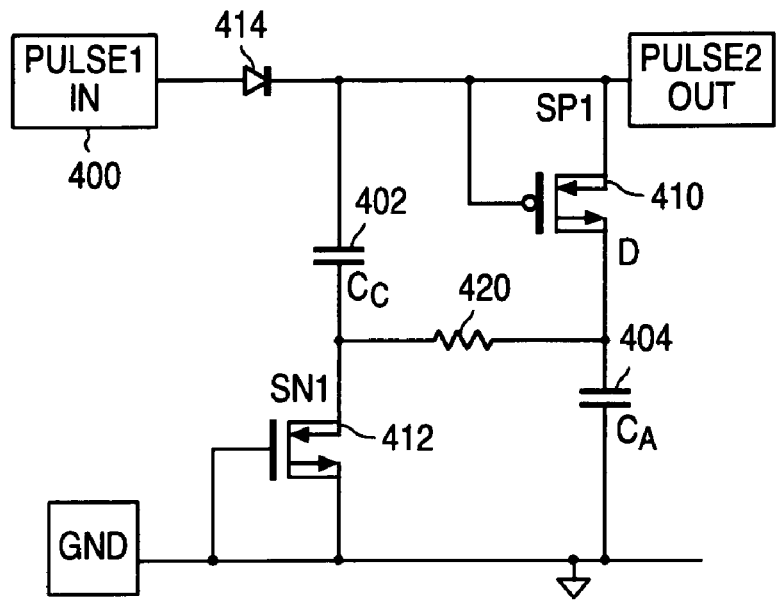
FIG. 4 is one embodiment of a charge pump converter of the invention.

FIG. 4 shows one embodiment of the invention. Instead of being supplied by a DC voltage supply with a complex clock circuit for controlling the switching of the switches for the charging and discharge cycles, the present embodiment makes use of a simple pulse generator 400 as input. The present embodiment makes use of two charging capacitors 402, 404, which are connected in parallel during the charging cycle, and in series for the discharge cycle.

During the charging cycle the switches defined by P-type LVTSCR 410 and N-type LVTSCR 412, are turned on to charge the capacitors 402, 404. During the discharge cycle, the two LVTSCRs 410, 412 turn off to connect the capacitors 402, 404 in series. Thus the output voltage is the sum of the voltages on the two capacitors. A diode 414 separates the capacitors from the pulse generator 400.

TCAD simulations of the circuit of FIG. 4 provide an indication of the output voltage from the circuit. The simulation results are illustrated in the graphs of FIGS. 5 and 6.

Figure 1:
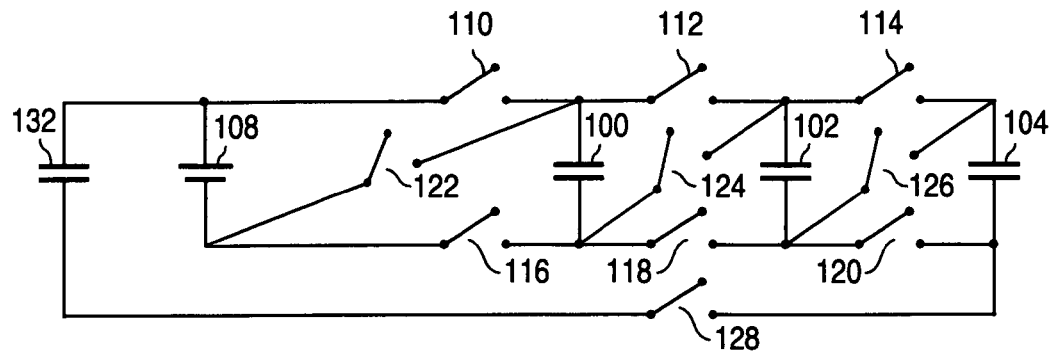
FIGS. 1 and 2 are illustrative circuit diagrams of a simple charge pump converter.
Figure 2:
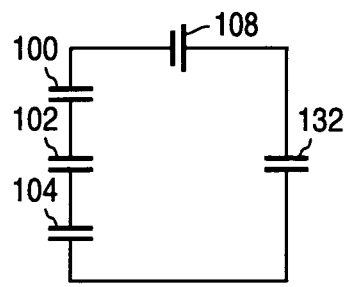
Figure 3:
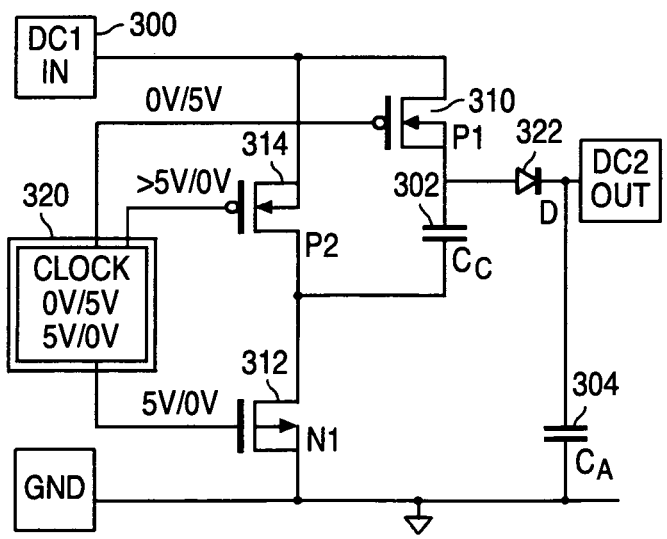
FIG. 3 is a schematic circuit diagram of a prior art charge pump converter.
Figure 5:
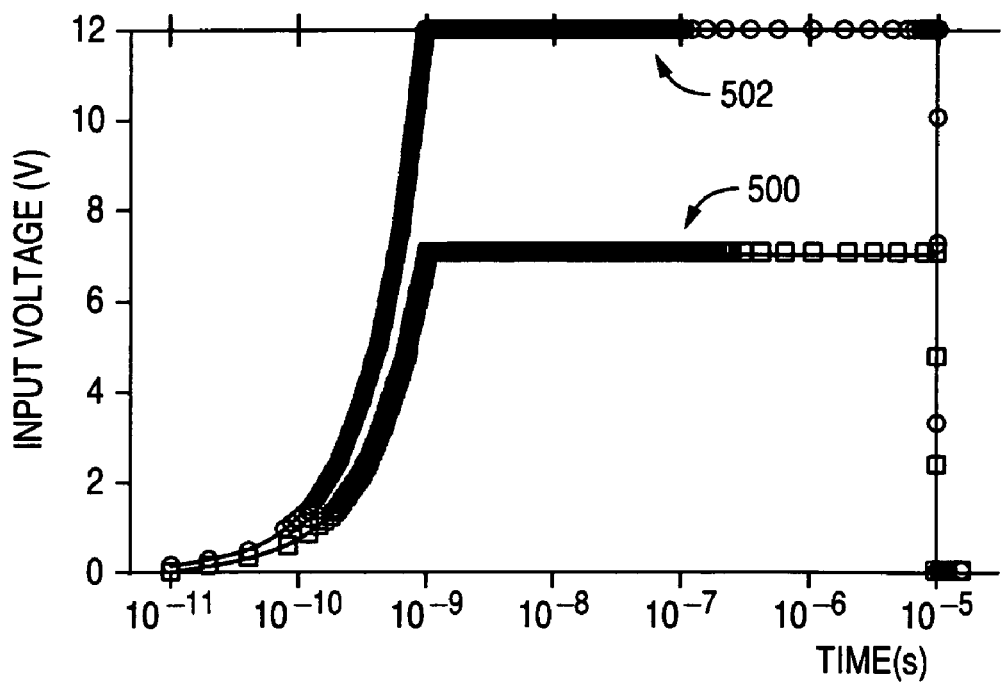
FIG. 5 shows TCAD results in the form of two input voltage curves over time supplied to a circuit of the invention.
Figure 6:
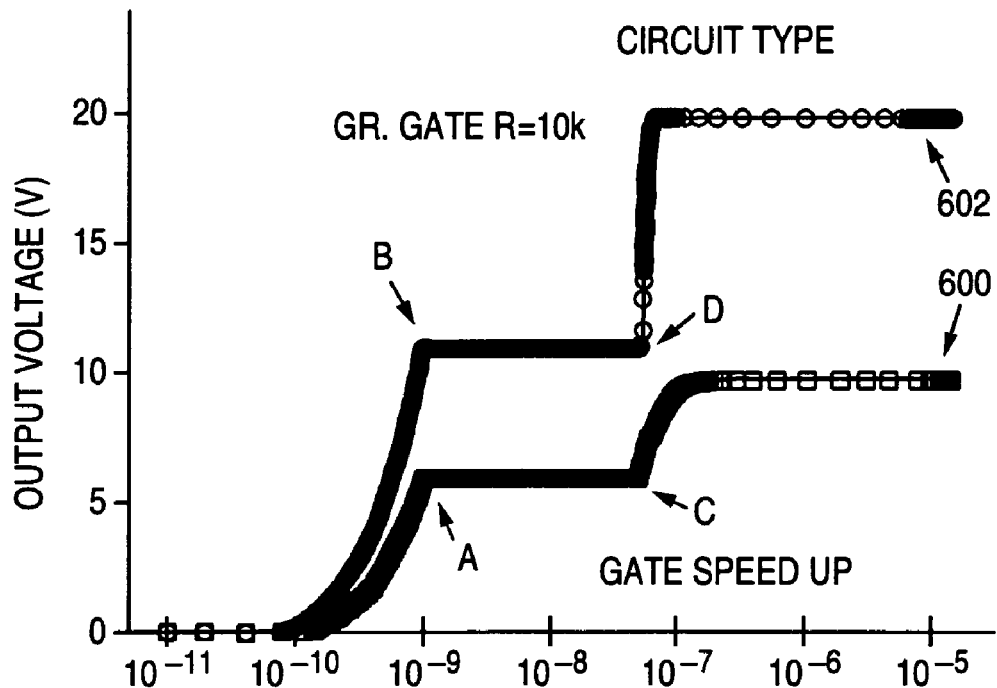
FIG. 6 shows output voltage curves over time for the two input voltages shown in FIG. 5, FIGS. 7–9 show schematic circuit diagrams for other embodiments of the invention.

FIG. 5 shows two different input voltage pulses, which have a rise time of about 1 ns. Curve 500 shows a 7 V pulse and curve 502 shows a 12 V pulse. FIG. 6 shows the corresponding output voltage curves. Curve 600 shows the output voltage curve (with output voltage of approximately 10 V) for the input pulse 500, while the curve 602 shows the output voltage curve (with output voltage of approximately 20 V) for the input pulse 502. In each case the charge cycle takes only about 100 ns. Initially curves 600 and 602 rise until triggering at about 6V and 11V, respectively (points A and B). At that point the LVTSCRs turn, on to charge the capacitors. At points C and D the LVTSCRs switch off. This can be achieved by simply having the input pulse drop below the holding voltage of the LVTSCRs (not shown in FIG. 5). Alternatively a clock can be used to control the switching off in a manner similar to the prior art approach described above with respect to FIG. 3 As can be seen from the graphs, the output voltage in each case is somewhat less than twice the input voltage. In fact, the voltage on the accumulation capacitor is approximately equal to the initial input pulse level minus the holding voltage of the LVTSCR. Thus it is desirable to provide a low holding voltage LVTSCR.

Figure 10:
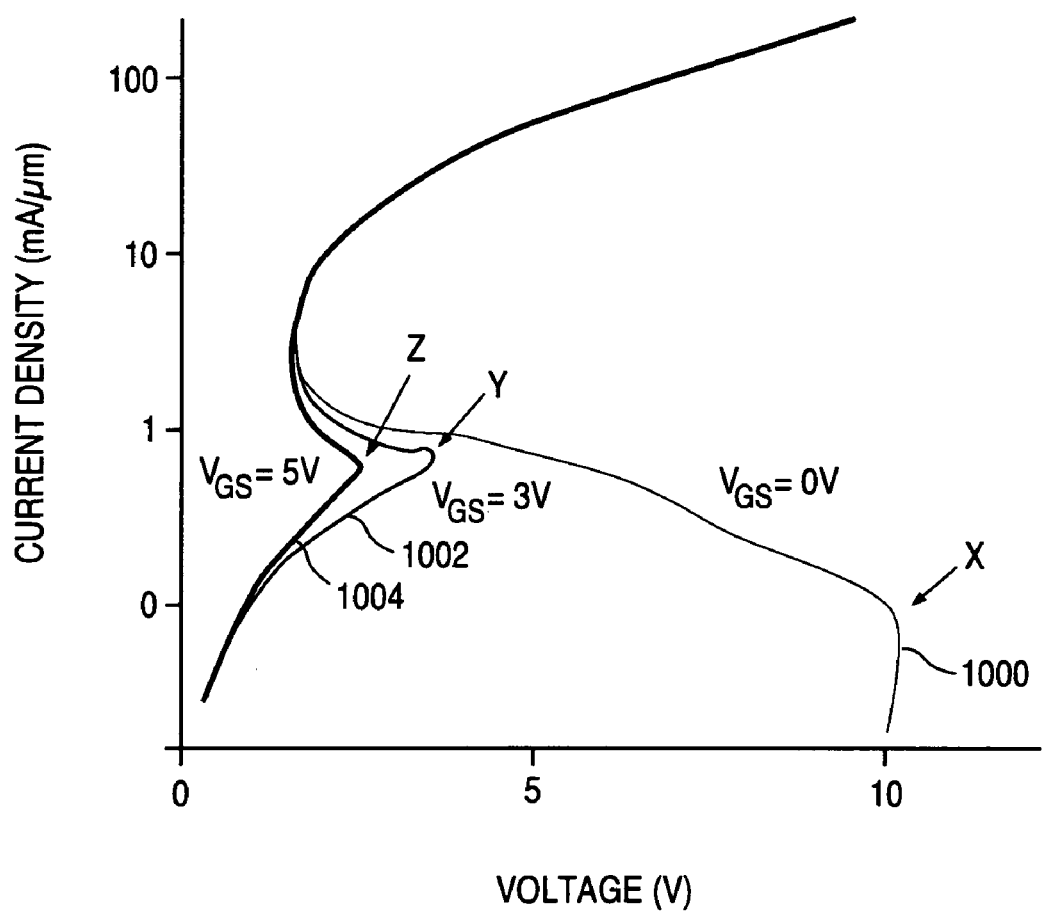
FIG. 10 shows I-V curves for a typical LVTSCR with different gate-source voltages.

Thus by making use of a pulse generator in conjunction with the snapback characteristics of LVTSCRs the present embodiment illustrates not only the use of high current LVTSCR switching elements but also the ability to provide a self-triggering solution to a charge pump converter. After triggering LVTSCRs can produce current densities of approximately 10–100 mA/μm due to conductivity modulation. This is some 100 to 1000 times greater than for NMOS and PMOS devices of similar size during normal operation. Seen another way, the use of LVTSCRs in snapback mode allows the capacitors to be charged in substantially the same time using triggering structures that have approximately 1000 times less contact width. Thus, it will be appreciated that the present invention provides for a circuit that is capable of being not only smaller but also faster. Furthermore, LVTSCRs have low on-state resistance and extremely low parasitic capacitance. Also, due to the bi-stable S-shaped I-V characteristic of a LVTSCR (as shown in FIG. 10 for different gate-source voltages), the LVTSCR can provide both self-triggering on and self-triggering off.

Thus, the use of LVTSCRs as switching elements provides a significant advantage over prior art solutions. In practice the embodiment of FIG. 4 has some drawbacks, since, in order to provide the requisite triggering current for the LVTSCR 412, the resistor 420 has to be fairly large.

Figure 7:
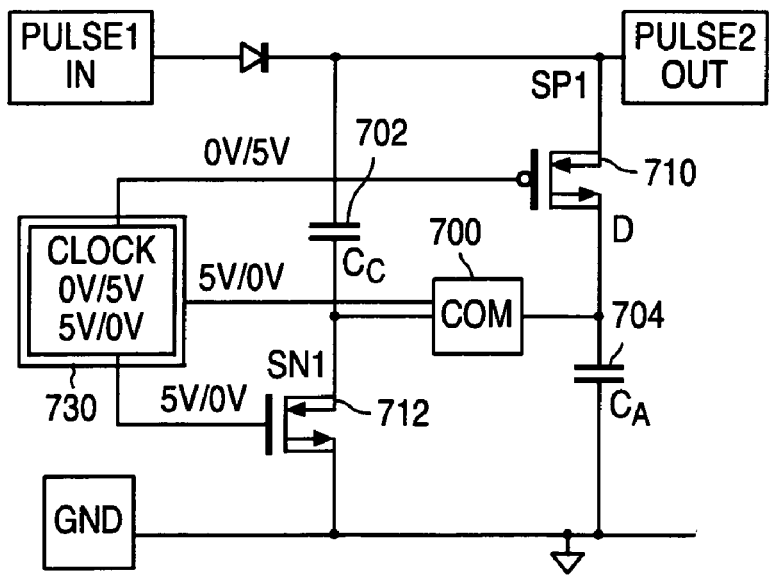

Another embodiment of the invention is shown in FIG. 7. This embodiment makes use of a commutator 700 to separate the two capacitors 702, 704. The commutator provides for better isolation of the capacitors during charging, and avoids the need for a high resistor. The commutator 700 can be any conventional commutator taking into account the required output resistance.

In order to reduce the triggering voltage, passive RC circuits an be connected to the gates of the LVTSCRs 710, 712 or, as shown in FIG. 7, the gates can be actively controlled using a clock generator 730. The clock circuit provides better control over the switching of the LVTSCRs. As is shown in FIG. 10, the triggering voltage is reduced by increasing the gate-source voltage, as shown by voltages of 0 V (curve 1000), 3 V (curve 1002) and 5V (curve 1004) (see triggering points X, Y, Z, respectively).

Figure 8:
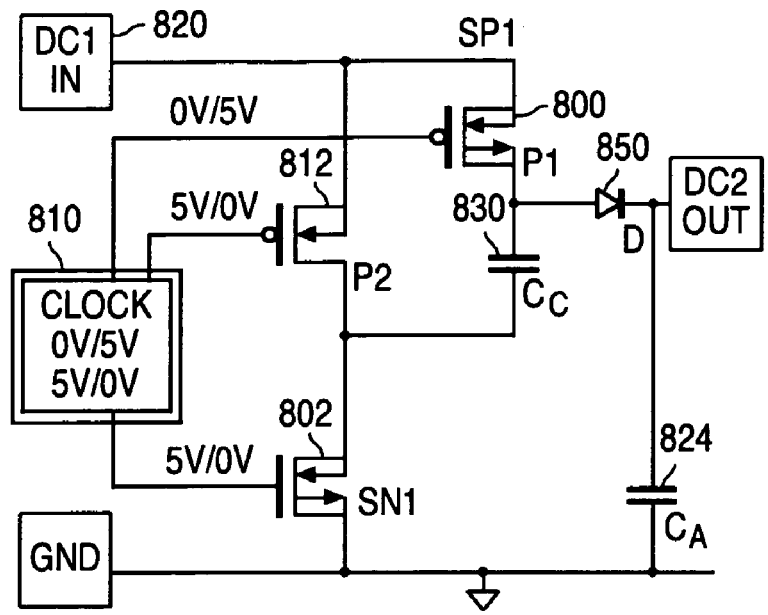

Yet another embodiment of the invention is shown in FIG. 8. This embodiment makes use of a dual stage converter similar to the prior art circuit of FIG. 3. However, instead of making use of a PMOS and an NMOS switching transistor to charge and discharge the accumulation capacitor, the present embodiment makes use of a P-type LVTSCR 800 and a N-type LVTSCR 802. Instead of a pulse voltage source, it uses a DC voltage source. The clock circuit 810 controls the gates of the LVTSCRs 800, 802 to realize the charging cycle of the accumulation capacitor 830, using the conductivity modulation condition of the LVTSCRs. The discharge cycle (second stage) is realized using channel current of the LVTSCRs 800, 802 operating as a normal NMOS and PMOS structure. In this embodiment, the commutation structure takes the form of a PMOS transistor 812, which is also controlled by the clock circuit 810. The clock circuit controls the gate of the PMOS transistor 812 to turn on transistor 812 when the LVTSCRs have triggered off, thereby connecting the DC power supply 820 and accumulation capacitor 830 in series over the output capacitor 824.

As discussed above, the use of the LVTSCRs provides for a smaller, higher current charge pump with lower parasitic capacitance and on-state resistance.

Figure 9:
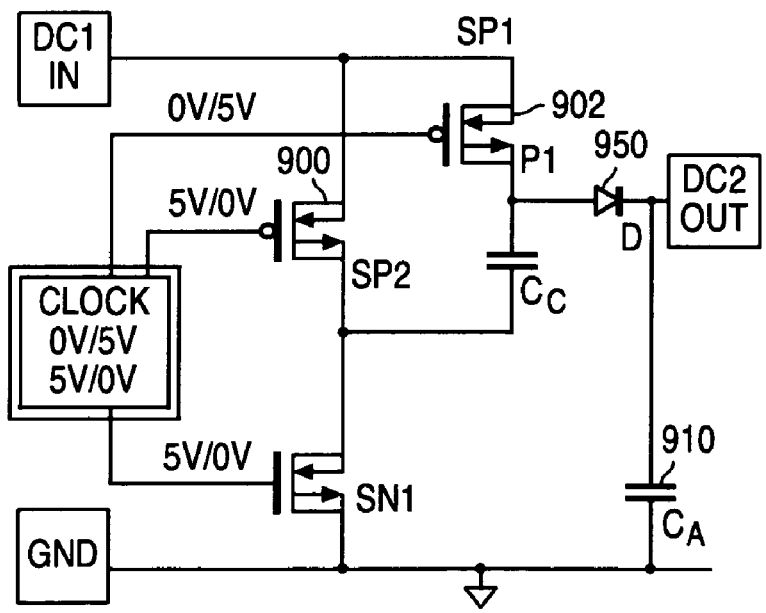

Yet another embodiment of the invention is shown in FIG. 9. This embodiment is for high power applications and, instead of using a PMOS as commutator, as in the FIG. 8 embodiment, it makes use of a LVTSCR 900. Thus, not only the charge portion is controlled by LVTSCRs, but also the switching across the output capacitor 910.

While the term P-type LVTSCR has been used to describe the structure 410, 710, 800, 902, different processes can be used to realize the structure. For instance an SOI process or triple well process or PMOS-based SCR.

It should be noted that the separation diodes 850, 950 are presented as diodes for reasons of simplicity. In practice a switch, such as a PMOS switch, could be used instead.

While a few specific embodiments were described, it will be appreciated that the concepts of the invention could be applied to different embodiments without departing from the scope of the invention.

What is claimed is:

1. A dual stage charge pump supplied by a DC supply, comprising
   one or more accumulation capacitors that are charged during a charging cycle,
   switching elements for connecting the one or more accumulation capacitors in series with the DC power supply and each other to provide an increased combined voltage during a discharge cycle, wherein the switching elements comprise two LVTSCRs that are controlled by a clock circuit, and wherein the LVTSCRs operate in snapback mode during the charging cycles, and
   a commutator connecting the accumulation capacitors in series during the discharge cycle.

2. A charge pump of claim 1, wherein the commutator is a PMOS transistor or a LVTSCR.

3. A charge pump having a pulse input signal, comprising
   a plurality of accumulation capacitors that are charged during a charging cycle, and
   switching elements for connecting the accumulation capacitors in parallel during the charging cycle and in series during a discharge cycle to provide an increased combined voltage, wherein at least one of the switching elements is a LVTSCR operating in snapback mode which makes use of the changing voltage levels of the pulse input signal to provide for self-triggering on and self-triggering off of the LVTSCR.

4. A DC—DC converter having a pulse input signal, comprising
   one or more accumulation capacitors that are charged during a charging cycle,
   an output capacitor, and
   switching elements for connecting the one or more accumulation capacitors in parallel during the charging cycle and in series with each other during the discharge cycle to provide an increased combined voltage during a discharge cycle, wherein at least one of the switching elements is a LVTSCR operating in snapback mode which makes use of the changing voltage levels of the pulse input signal to provide for self-triggering on and self-triggering off of the LVTSCR.

5. A DC-DC converter of claim 4, wherein the switching elements comprise two LVTSCRs, and wherein the charge pump includes one accumulation capacitor, and a commutator separating the accumulation capacitor and output capacitor.

* * * * *